US005749225A

United States Patent [19]

Olney

[11] Patent Number: 5,749,225

[45] Date of Patent: May 12, 1998

[54] HYDRAULIC SYSTEMS AND VALVE ASSEMBLIES

[75] Inventor: Gifford James Olney, Oxfordshire, England

[73] Assignee: Smiths Industries PLC, London, England

[21] Appl. No.: 801,145

[22] Filed: Feb. 18, 1997

[30] Foreign Application Priority Data

Feb. 23, 1996 [GB] United Kingdom .................. 9603894

[51] Int. Cl.$^6$ .................................................. F16D 31/02

[52] U.S. Cl. ................................ 60/477; 91/420; 91/446; 137/102; 251/63.4

[58] Field of Search ............................ 60/466, 460, 477; 91/420, 446; 137/102; 251/63.4

[56] References Cited

U.S. PATENT DOCUMENTS 3,126,706 3/1964 Dettinger ................................ 60/460

5,638,679 6/1997 Richards ................................ 60/453

*Primary Examiner*—Edward K. Look

*Assistant Examiner*—Bijan N. Karimi

*Attorney, Agent, or Firm*—Pollock, Vande Sande & Priddy

[57] ABSTRACT

An hydraulic system has an hydraulic cylinder connected to a reversible pump by a first fluid line. A check valve assembly is connected in the first line and in a second line extending from the pump to a tank. The check valve assembly has a ball that seats on a conical valve seat to enable flow of fluid from the pump to the cylinder but to prevent flow in the opposite direction. A shuttle member in the check valve assembly is displaced by fluid pressure in the second line when the pump is reversed to unseat the ball and allow flow from the cylinder in the opposite direction via the pump to the tank.

7 Claims, 2 Drawing Sheets

HYDRAULIC SYSTEMS AND VALVE ASSEMBLIES

BACKGROUND OF THE INVENTION

This invention relates to hydraulic systems and valve assemblies.

Hydraulic systems often include a single-acting hydraulic device, such as a cylinder connected to a pump via a check valve. The cylinder is used to apply a force, such as to raise a load, the check valve preventing flow in the opposite direction on loss of power. To relieve the force, such as to lower the load, hydraulic fluid must be allowed to flow back out of the cylinder to a tank. This can be achieved by opening a valve to allow fluid to bypass the pump and the check valve, and flow directly back to the tank. The problem with such systems is that electrically-controlled solenoid valves are relatively expensive so are not suited for low-cost applications. Although manual valves are cheaper, they need to be separately operated by the user, which is not practical in many applications. One alternative way in which hydraulic fluid can be returned to the tank without the need for a solenoid valve is to allow it to flow back through the pump. Such a system is arranged so that the pump, when reversed, supplies pressure via a pilot line to a pilot-operated check valve, so that this is opened and allows fluid to flow from the cylinder, via the pump to the tank. The problem with such systems is that conventional circuits can only generate fluid pressure sufficient to open the check valve when the pump is operated at relatively high power levels. The power required to lower a load can, in fact be greater than that needed to raise the load. This leads to a high electrical power consumption and increased noise. The high electrical power consumption is a particular problem in battery-powered systems.

BRIEF SUMMARY OF THE INVENTION

It is an object of the present invention to provide an improved hydraulic system and valve assembly.

According to one aspect of the present invention there is provided an hydraulic system including a pump, an hydraulically-operated device, a first fluid line extending between the device and the pump, a tank, a second fluid line extending between said pump and said tank, a check valve assembly connected in both said first and second fluid lines, said check valve assembly having a check valve that allows fluid flow in a first direction from the pump to the device and normally prevents flow along the first line in a second, opposite direction, said check valve assembly having an openable passage to prevent or enable flow along said second line, and said check valve assembly being operable such that when the pump is operated to supply fluid in said first direction said check valve opens to allow substantially unrestricted flow of fluid along said first line in said first direction to said device and said passage is closed to prevent flow from the pump to the tank via the check valve assembly, and such that when the pump is operated in reverse to enable fluid flow in the opposite direction along said first fluid line, fluid pressure in said second line causes both said check valve and said passage to open such that fluid can flow in said second direction from said first fluid line to said tank via the check valve, the pump, the open passage and the second fluid line.

The check valve preferably includes a valve seat and a valve element operable to locate on said seat, the valve seat being located between a first and second port such that the valve element allows flow from said second port to said first port but normally prevents flow in the opposite direction, the check valve assembly having a shuttle member located between said second port and a third port such that a greater pressure at the third port than the second port causes the shuttle member to move from a first position in which the shuttle member does not displace the valve element to a second position in which the shuttle member unseats the valve element from the valve seat, and the valve assembly having a fourth port that is normally substantially closed when the shuttle member is in its first position but that is open when the shuttle member is in its second position such that fluid can flow between the third port and the fourth port.

According to another aspect of the present invention there is provided an hydraulic system including a pump, an hydraulically-operated device, a first fluid line extending between the device and the pump, a tank, a second fluid line extending between said pump and said tank, and a check valve assembly connected in both said first and second fluid lines, said check valve assembly having a check valve that allows fluid flow in a first direction from the pump to the device and normally prevents flow along the first line in a second, opposite direction, said check valve assembly having an openable passage to prevent or enable flow along said second line, said check valve including a valve seat and a valve element operable to locate on said seat, said valve seat being located between a first and second port such that the valve element allows flow from said second port to said first port but normally prevents flow in the opposite direction, and said check valve assembly including a shuttle member located between said second port and a third port such that a greater pressure at the third port than the second port causes the shuttle member to move from a first position in which the shuttle member does not engage the valve element to a second position in which the shuttle member unseats the valve element from the valve seat, the valve assembly having a fourth port that is normally substantially closed when the shuttle member is in its first position but that is open when the shuttle member is in its second position such that fluid can flow between the third port and the fourth port.

The valve element is preferably a ball and the valve seat is preferably conical with a central opening. The shuttle member may have a projection aligned with the opening in the valve seat such that when the shuttle member is displaced, the projection moves in the opening and displaces the ball away from the valve seat to allow flow through the opening. The hydraulically-operated device may be a single-acting cylinder.

According to a further aspect of the present invention there is provided a check valve assembly including first, second, third and fourth ports opening into said valve assembly, a valve seat located between the first and second ports, a valve element operable to locate on the seat such that the valve element allows flow from the second port to the first port but normally prevents flow in the opposite direction, a shuttle member located between the second port and the third port such that a greater pressure at the third port than the second port causes the shuttle member to move from a first position in which the shuttle member does not displace the valve element from the valve seat to a second position in which the shuttle member unseats the valve element from the valve seat so as to allow flow from the first port to the second port in the opposite direction, the fourth port being normally substantially closed when the shuttle member is in its first position but being open when the shuttle member is in its second position such that fluid can flow between the third port and the fourth port.

The second port and third port may be connected with one another externally of the assembly.

A hydraulic system including a check valve assembly, in accordance with the present invention, will now be described, by way of example, with reference to the accompanying drawings.

DESCRIPTION OF PRIOR ART

Figure 1:
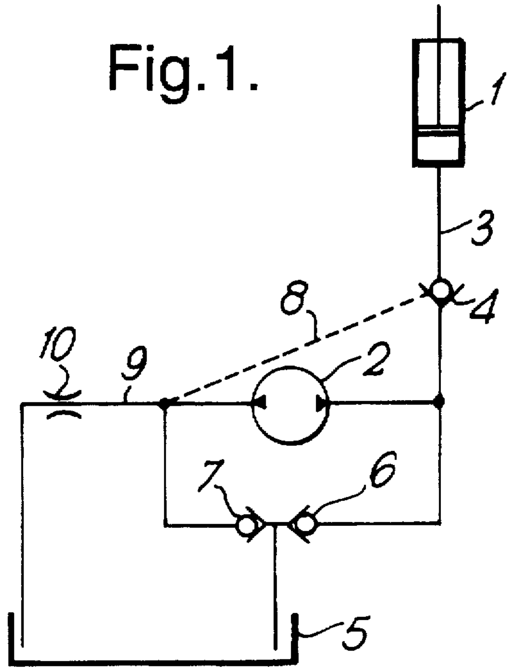
FIG. 1 is a schematic drawing of a prior art system.

With reference to FIG. 1, there is shown a conventional hydraulic system including a single-acting hydraulic cylinder 1 connected to a reversible pump 2 via a fluid line 3. A pilot-operated check valve 4 is connected in line 3 to allow fluid to flow from the pump 2 to the cylinder 1 but to prevent flow of fluid out of the cylinder when the pump stops. Both sides of the pump 2 are connected to a fluid tank 5 via respective check valves 6 and 7 arranged to allow fluid to flow from the tank to the side of the pump acting as an inlet. The check valves 6 and 7 also isolate the outlet of the pump 2 from the tank 5. The left-hand side of the pump 2, which acts as an inlet when the pump is operated in its forward direction, is connected via a pilot line 8 to the pilot-operated check valve 4. The left-hand side of the pump 2 is also connected to the tank 5 via a line 9 including a flow restrictor 10.

When the pump 2 is operated in its forward direction, to raise the piston in the cylinder 1, fluid is drawn from the tank 5 via the check valve 7 and is supplied by the pump along line 3, opening the pilot-operated check valve 4. When the pump 2 is stopped, the pilot-operated check valve 4 seats and prevents flow out of the cylinder 1. To lower the piston in the cylinder 1, the pump 2 is driven in its reverse direction so that it draws fluid from the tank 5 via the check valve 6. The fluid flows into line 9 where the pressure in the line produced by the restrictor 10 causes fluid to be supplied along the pilot line 8, so as to open the pilot-operated check valve 4. This enables fluid to flow through the pilot-operated check valve 4 to the inlet of the pump 2 and then to be pumped by the pump along line 9, through the restrictor 10, and to the tank 5.

The flow restrictor 10 must provide a sufficient restriction to ensure that the pressure supplied along the pilot line 8 is high enough to open the pilot-operated check valve 4 when the cylinder 1 is under maximum load. For this reason, the restrictor 10 presents a substantial restriction to return fluid flow from the cylinder 1 to the tank 5 via the pump. This restriction to fluid flow produces a substantial load on the pump 2, making it draw relatively large amounts of power in reverse and causing relatively high levels of noise. The high power consumption is a particular problem in battery-powered systems, since it reduces the use that can be made of the system between charges.

DETAILED DESCRIPTION OF PREFERRED EMBODIMENT

Figure 2:
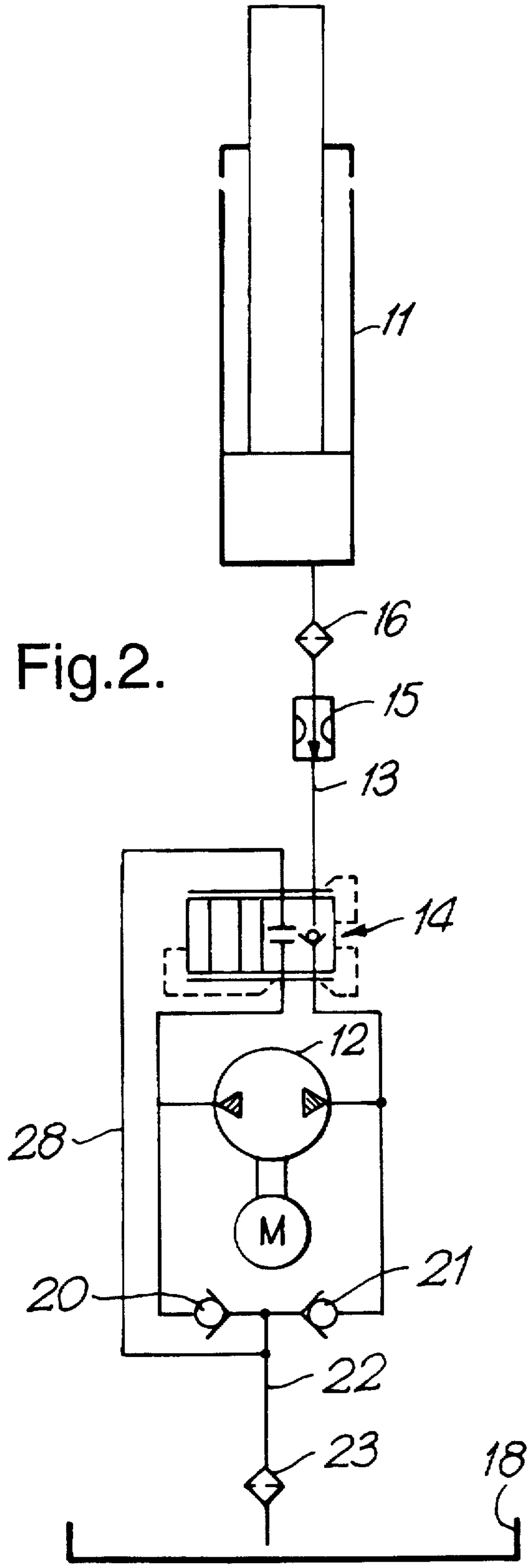
FIG. 2 is a schematic drawing of a system according to the present invention.

With reference now to FIG. 2, there is shown a system according to the present invention. The system has a single-acting hydraulic cylinder 11, which may be connected to raise the arm of a patient hoist (not shown), and a reversible pump 12 connected to the cylinder via a fluid line 13. Connected in the fluid line 13 are a novel pilot-operated check valve assembly 14, a flow limiter 15 and a filter 16.

Both outlets/inlets of the pump 12 are connected to the pilot-operated check valve assembly 14; the outlets/inlets are also connected to the tank 18 via respective check valves 20 and 21 and a return line 22 containing a filter 23. One check valve 20 is arranged so that it opens when the pump 12 operates in a forward direction to supply fluid to the cylinder: the other check valve 21 opens when the pump operates in reverse.

A fluid bypass line 28 extends from the pilot-operated check valve assembly 14 to the return line 22 so as to provide a return path for fluid when the pump 12 operates in its reverse direction.

Figure 3:
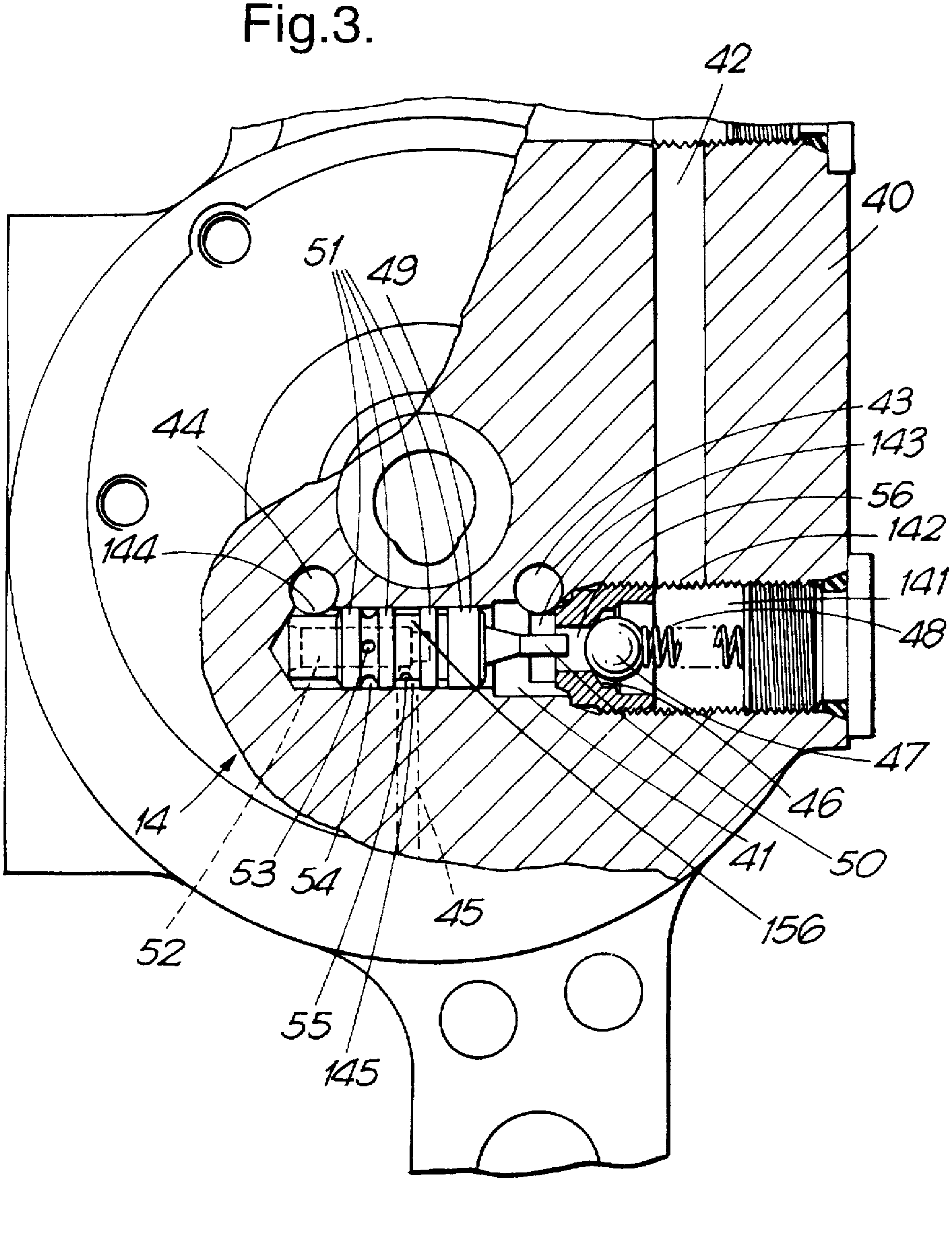
FIG. 3 is a cross-sectional side elevation of the check valve assembly.

The pilot-operated check valve assembly 14 is shown in greater detail in FIG. 3. The housing of the valve assembly 14 is formed by a metal block 40 having a cavity 41 containing the components of the valve assembly and having four bores 42 to 45 providing fluid passages to and from the valve via respective ports 142, 144, 144 and 145. The right-hand side of the cavity 41 contains a conical valve seat 46 having a central opening 56. A valve element in the form of a steel ball 47 is urged to the left against the seat 46 by a helical spring 48. The cavity 141 to the right of the valve seat 46 opens via the port 142 into the bore 42, which forms a part of the cylinder supply line 13. The bore 43 opens into the cavity 41 via port 143 immediately to the left of the valve seat 46 and forms a part of the fluid line extending from the forward outlet of the pump 12. Pressure from port 143, therefore, lifts the ball 47 off the valve seat 46 so that fluid can flow from the pump 12 into the cylinder supply line 13. Fluid cannot normally flow in the opposite direction, so that the valve element 47 and the seat 46 act as a check valve.

Within the left-hand end of the cavity 41 there is a slidable shuttle 49, which has a pin 50 projecting axially at its forward end. The shuttle 49 has four sealing rings 51 around its circumference, which are a close fit and make sliding seals with the inside of the cavity 41. The shuttle 49 is normally held at the left-hand end of the cavity 41, as shown, by the pressure from the port 143. In this position, the sealing ring 51 closest to the left-hand end of the shuttle 49 is located just forwardly, to the right of, the port 144, which is connected via the bore 44 to the reverse outlet of the pump 12. An axial bore 52 extends about halfway along the length of the shuttle 49 and opens at its left-hand end. The bore 52 opens through four radial apertures 53 into an annular recess 54 located between two of the sealing rings 51 towards the left-hand end of the shuttle 49. The bore 52 also opens through a much smaller orifice 55 into another annular recess 156 located between another two of the sealing rings 51 located about midway along the length of the shuttle 49. In the position shown, this recess 156 is located in alignment with the port 145 of the bore 45, which forms a part of the fluid bypass line 28.

FIG. 3 shows the pilot-operated check valve assembly 14 when the pump 12 is operating in its forward direction so that fluid can flow from the port 143 to port 142 by unseating the ball 47 from its seat 46. When the pump 12 stops, the ball 47 locates again on its seat 46, preventing flow along line 13 in the opposite direction. When the pump 12 is reversed, to lower the piston in the cylinder 11, fluid flows into the valve assembly 14 via bore 44 thereby displacing the shuttle 49 to the right to its full extent. This has two effects: one is that the pin 50 extends through the opening 56, thereby pushing the ball 47 off its seat 46; the other effect is that the recess 54 on the shuttle 49 comes into alignment with the port 145 of bore 45, which forms a part of the fluid bypass line 28. The result of this is that fluid from the cylinder 11 can flow along bore 42, around the unseated ball 47 and into bore 43, which extends to the inlet of the pump 12. When the fluid emerges from the outlet of the pump 12 it flows via bore 44 and the port 144 into the rear end of the cavity 41. The fluid then flows through the bore 52 along the shuttle 49, out through the apertures 53 into the recess 54 and, from there, via the bore 45 into the bypass line 28. The fluid then flows back to the tank 18.

When the pump 12 is reversed, the force initially required from the pump must be sufficient to displace the shuttle 49 and unseat the ball 47 against the differential pressure across the ball. Once, however, the ball 47 has been lifted from the seat 46, the force required to maintain this open position is lower because it is only necessary to resist the flow forces of the fluid around the ball. The resistance to flow of fluid, in the reverse direction, through the pilot-operated check valve assembly 14 can be relatively low because only a low differential pressure is required across the shuttle 49 to keep it in the open position. To stop lowering the cylinder 1, the pump 12 is stopped allowing the load pressure from the cylinder in bore 42 to rise above that in bore 44 thereby displacing the shuttle 49 to the left sufficiently for it to allow the ball 47 to locate on the seat 46 and prevent flow of fluid through the valve. The bore 52 and small orifice 55 in the shuttle 49 enable fluid trapped in the cavity 41 to the left of the shuttle 49 to flow out of the cavity 41 via the tank bore 45, thereby ensuring that the shuttle is not prevented from moving to the left.

The power supplied to the pump 12 when operating in the reverse direction can be very low compared with the prior system described above with reference to FIG. 1. This reduction in power has several important advantages. Firstly, in battery-powered systems, it enables considerably more use to be made of the system before the battery has to be recharged and reduces the risk of the system locking because of insufficient power caused by inadvertent prolonged use. Secondly, it reduces heating of the motor driving the pump, thereby prolonging its life. Thirdly, it reduces the noise produced by the motor.

Various modifications can be made to the check valve assembly and the system. For example, other forms of valve element than a ball valve could be used. The system can be used in many applications other than patient hoists.

What I claim is:

1. An hydraulic system comprising an hydraulically-operated device; a reversible pump; a first fluid line extending between said device and said pump; a tank; a second fluid line extending between said pump and said tank; a check valve assembly, said check valve assembly having a check valve including a valve seat and a valve element operable to locate on said seat, said valve seat being located between a first and second port such that said valve element allows flow from said second port to said first port but prevents flow in the opposite direction, said check valve assembly having a shuttle member located between said second port and a third port such that a greater pressure at said third port than said second port causes said shuttle member to move from a first position in which said shuttle member does not displace said valve element to a second position in which said shuttle member unseats said valve element from said valve seat, and said valve assembly having a fourth port that is substantially closed when said shuttle member is in its first position but that is open when said shuttle member is in its second position such that fluid can flow between said third port and said fourth port; a connection of said first port to said device via said first fluid line; a connection of said second port to said pump via said first fluid line; a connection of said third port to said pump via said second fluid line; and a connection of said fourth port to said tank via said second line, such that when said pump is operated to supply fluid in a first direction said check valve opens to allow substantially unrestricted flow of fluid along said first line in said first direction to said device and prevents flow from said pump to said tank via said check valve assembly, and such that when said pump is operated in reverse to enable fluid flow in a second direction opposite to said first direction along said first fluid line, said check valve assembly enables fluid to flow from said first fluid line to said tank via said check valve, said pump, said third and fourth ports and said second fluid line.

2. An hydraulic system comprising: an hydraulically-operated device; a pump; a first fluid line extending between said device and said pump, a tank; a second fluid line extending between said pump and said tank; and a check valve assembly connected in both said first fluid line and said second line, said check valve assembly having a check valve that allows fluid flow in a first direction from said pump to said device and prevents flow along said first line in a second, opposite direction, wherein said check valve assembly has an openable passage to prevent or enable flow along said second line, wherein said check valve includes a valve seat and a valve element operable to locate on said seat, said valve seat being located between a first and second port such that said valve element allows flow from said second port to said first port but prevents flow in the opposite direction, and wherein said check valve assembly includes a shuttle member located between said second port and a third port such that a greater pressure at said third port than said second port causes said shuttle member to move from a first position in which said shuttle member does not engage said valve element to a second position in which said shuttle member unseats said valve element from said valve seat, and wherein said valve assembly has a fourth port that is normally substantially closed when said shuttle member is in its first position but that is open when said shuttle member is in its second position such that fluid can flow between said third port and said fourth port.

3. An hydraulic system according to claim 1 or 2, wherein said valve element is a ball and said valve seat is conical with a central opening.

4. An hydraulic system according to claim 3, wherein said shuttle member has a projection aligned with said opening in said valve seat such that when said shuttle member is displaced, said projection moves in said opening and displaces said ball away from said valve seat to allow flow through said opening.

5. A check valve assembly comprising: first, second, third and fourth ports opening into a valve assembly; a valve seat located between said first and second ports; a valve element operable to locate on said seat such that said valve element allows flow from said second port to said first port but prevents flow in the opposite direction; a shuttle member located between said second port and said third port such that a greater pressure at said third port than said second port causes said shuttle member to move from a first position in which said shuttle member does not displace said valve element from said valve seat to a second position in which said shuttle member unseats said valve element from said valve seat so as to allow flow from said first port to said second port in the opposite direction, and wherein said fourth port is substantially closed when said shuttle member is in its first position but is open when said shuttle member is in its second position such that fluid can flow between said third port and said fourth port.

6. A check valve assembly according to claim 5, wherein said second port and said third port are connected with one another externally of said valve assembly.

7. A check valve assembly according to claim 5 or 6, wherein said valve element is a ball, wherein said valve seat is conical with a central opening, and wherein said shuttle member has a projection aligned with said opening in said valve seat such that when said shuttle member is displaced, said projection moves in said opening and displaces said ball away from said valve seat to allow flow through said opening.

* * * * *